(12) United States Patent
Danielson et al.

(10) Patent No.: US 10,718,455 B2
(45) Date of Patent: Jul. 21, 2020

(54) INTERNAL THREAD GRIP FLUID CONNECTOR

(71) Applicant: FasTest, Inc., Roseville, MN (US)

(72) Inventors: Robert Danielson, Roseville, MN (US); Allen Wagenius, Roseville, MN (US)

(73) Assignee: FasTest, Inc., Roseville, MN (US)

(*) Notice: Subject to any disclaimer, the term of this patent is extended or adjusted under 35 U.S.C. 154(b) by 289 days.

(21) Appl. No.: 15/664,590

(22) Filed: Jul. 31, 2017

(65) Prior Publication Data

US 2018/0038539 A1     Feb. 8, 2018

Related U.S. Application Data

(60) Provisional application No. 62/369,930, filed on Aug. 2, 2016.

(51) Int. Cl.
*F16L 37/12* (2006.01)
*F16L 37/52* (2006.01)
*F16L 37/138* (2006.01)
*F16L 37/133* (2006.01)

(52) U.S. Cl.
CPC ......... *F16L 37/1215* (2013.01); *F16L 37/133* (2013.01); *F16L 37/138* (2013.01); *F16L 37/52* (2013.01)

(58) Field of Classification Search
CPC ....... F16L 37/18; F16L 37/138; F16L 37/121; F16L 37/1215; F16L 37/52; F16L 37/133
USPC ................................ 285/312, 314, 316, 322
See application file for complete search history.

(56) References Cited

U.S. PATENT DOCUMENTS

| 2,675,829 | A | * | 4/1954 | Livers | F16L 37/133 |
| | | | | | 285/322 |
| 4,688,830 | A | | 8/1987 | Meisinger et al. | |
| 4,716,938 | A | | 1/1988 | Weh et al. | |
| 5,439,258 | A | * | 8/1995 | Yates | F16L 37/138 |
| 5,740,835 | A | * | 4/1998 | Murphy | F16L 37/138 |
| 5,788,290 | A | | 8/1998 | Meisinger | |
| 5,927,683 | A | * | 7/1999 | Weh | F16L 37/1215 |
| | | | | | 285/316 X |
| 5,950,679 | A | | 9/1999 | Danielson et al. | |
| 6,283,443 | B1 | * | 9/2001 | Taneya | F16L 37/133 |
| | | | | | 285/316 |

(Continued)

FOREIGN PATENT DOCUMENTS

| EP | 0355155 | 9/1992 |
| JP | 2009-150449 | 7/2009 |
| WO | 2009005858 | 1/2009 |

OTHER PUBLICATIONS

International Search Report and Written Opinion for international application No. PCT/US2017/044656, dated Sep. 26, 2017 (10 pages).

(Continued)

*Primary Examiner* — Zachary T Dragicevich
(74) *Attorney, Agent, or Firm* — Hamre, Schumann, Mueller & Larson, P.C.

(57) ABSTRACT

A fluid connector that connects a first fluid system with a fluid port of a second fluid system for transferring fluids, including gaseous or liquid fluids, between the first and second fluid systems. The fluid connector can be used with differently configured, non-matching threaded fluid ports and allow for misalignment/tipping of the fluid connector to maintain a seal with the fluid port.

14 Claims, 10 Drawing Sheets

(56) References Cited

U.S. PATENT DOCUMENTS

| | | |
|---|---|---|
| 2005/0167981 A1 | 8/2005 | Nuttall et al. |
| 2012/0086202 A1* | 4/2012 | Tiberghien ............ F16L 37/138 |
| 2013/0174928 A1 | 7/2013 | Danielson |
| 2016/0258563 A1 | 9/2016 | Danielson et al. |
| 2016/0312915 A1* | 10/2016 | Konishi .............. F16L 37/1215 |

OTHER PUBLICATIONS

Chinese Office Action, issued in the corresponding Chinese patent application No. 201780049300.0, dated Mar. 23, 2020, 18 pages.

\* cited by examiner

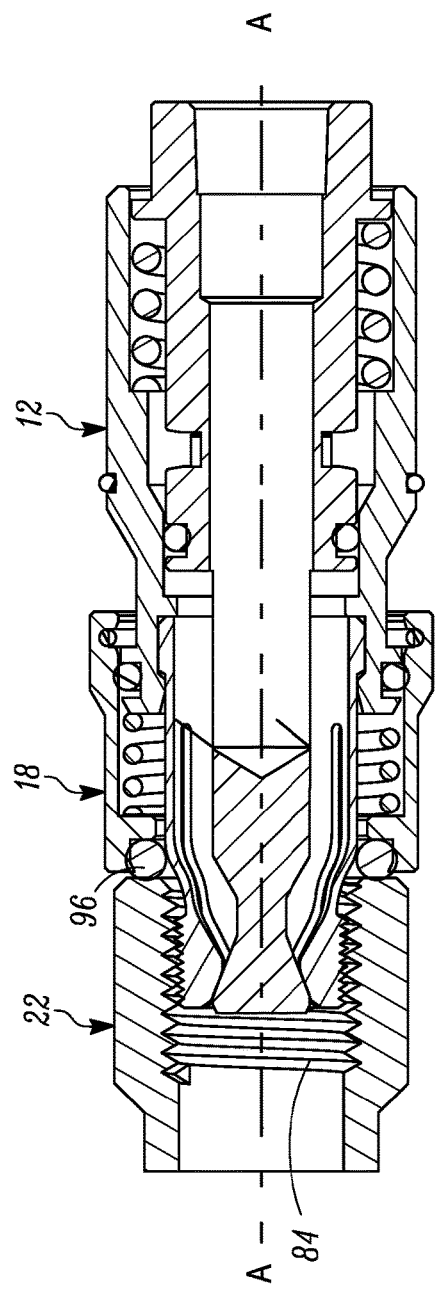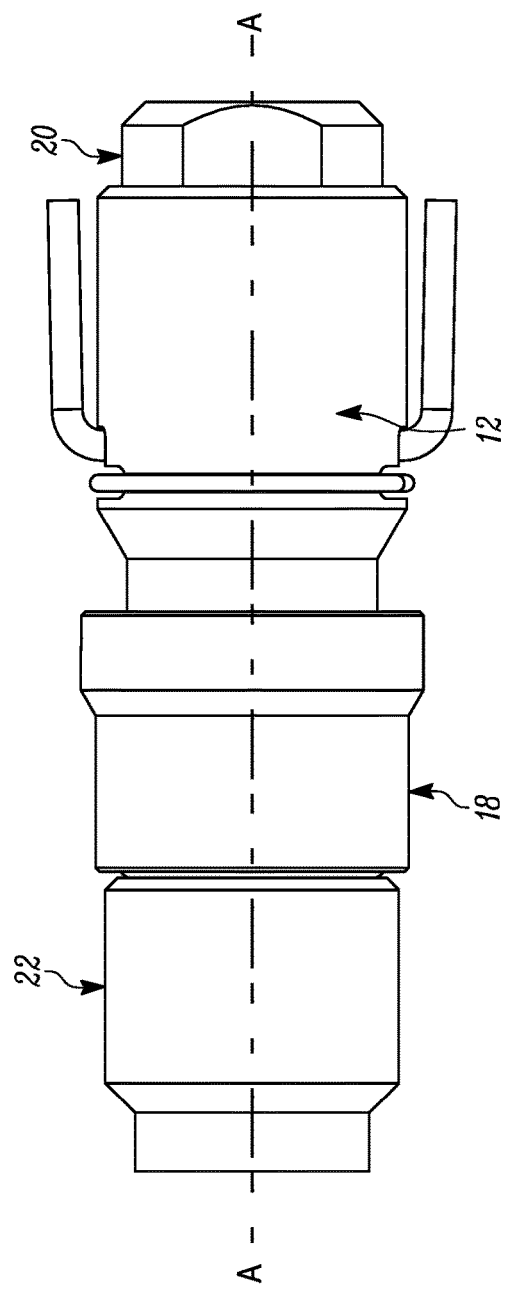
FIG. 5A
FIG. 5B

INTERNAL THREAD GRIP FLUID CONNECTOR

FIELD

This disclosure relates to a fluid connector that can be used to, for example, connect a first fluid system with a second fluid system for transferring fluids, including gaseous or liquid fluids, between the first and second fluid systems, or for sealing a fluid system using the fluid connector.

BACKGROUND

An example of an existing fluid connector is described in U.S. Pat. No. 4,688,830. As described in this patent, the connector is designed to be hand threaded into a threaded port to permit transfer of fluids through the connector. In U.S. Pat. No. 4,688,830, the threads on the connector are designed to match the threads on the threaded port.

Another example of an existing fluid connector is described in U.S. Pat. No. 5,950,679. In U.S. Pat. No. 5,950,679, the threads on the collets are designed to match the threads on the threaded port to which it connects. Other examples of fluid connectors include those disclosed in U.S. Pat. Nos. 5,788,290 and 4,716,938.

SUMMARY

Fluid connectors are described that connect a first fluid system with a fluid port of a second fluid system for transferring fluids, including gaseous or liquid fluids, between the first and second fluid systems, or for sealing a fluid system using the fluid connector. The described fluid connectors are provided with a number of unique features, that can be used individually or in any combination thereof, that allow a single described fluid connector to be used with differently configured fluid ports.

A fluid connector described herein can include a sleeve and a connector body that can tilt relative to one another at an angle relative to the longitudinal axis of the fluid connector. The tilting allows the fluid connector to misalign with the fluid port the fluid connector is connected to, while the fluid connector still maintains its seal with the second fluid system.

In addition, a fluid connector described herein is designed to grip against internal threads of the fluid port. For example, the fluid connector can have external threads. The fluid connector does not have threads that match the internal threads of the fluid port as in typical fluid connectors. Instead, the fluid connector grips against one or more crests of the internal threads. Since the external threads of the described fluid connector do not actually mate with the internal threads of the fluid port, a single described fluid connector can be used with different fluid ports that have different thread configurations.

In addition, a fluid connector described herein can include a collet assembly having a plurality of collets that are movable between an expanded position and a collapsed position, and the collet assembly is a single piece, unitary construction.

In addition, a fluid connector described herein can include first and second handles connected to a piston of the fluid connector at opposite diametric locations so that the first and second handles oppose one another, and the first and second handles can be manually actuated to actuate the piston from a default position to a connection position.

The tilting of the sleeve, the mismatch between the threads, the single piece, unitary construction of the collet assembly, the opposing first and second handles for actuating the piston, or the fluid actuation of the piston in the fluid connector, can be used in combination with one another as illustrated and described herein, individually and separately by themselves in fluid connectors, or in any combination thereof.

As described in further detail herein, a fluid connector that fluidly connects a first fluid system with a fluid port of a second fluid system can include a body, a collet assembly with a plurality of collets, a sleeve, a piston, and a longitudinal axis. A seal is disposed between the sleeve and the collet assembly and the seal is positioned to seal with the second fluid system to prevent fluid leakage between the fluid connector and the second fluid system when the fluid connector is connected to the fluid port. The body, the collet assembly and the piston can tilt relative to the sleeve at an angle greater than 1 degree with the seal maintaining sealing engagement with the second fluid system to prevent fluid leakage between the fluid connector and the second fluid system.

As also described in further detail herein, a fluid connector that fluidly connects a first fluid system with a fluid port of a second fluid system can include a body, a collet assembly with a plurality of collets, a sleeve, a piston, and a longitudinal axis. Each collet of the plurality of collets includes exterior threads, the fluid port includes interior threads, and the exterior threads do not match the interior threads. For example, the exterior threads can have a threads per inch that is greater than, for example 2 times greater than, a threads per inch of the interior threads.

As also described in further detail herein, a fluid connector that fluidly connects a first fluid system with a fluid port of a second fluid system can include a body, a collet assembly with a plurality of collets, a sleeve, a piston, and a longitudinal axis. The collet assembly is a single piece, unitary construction and the plurality of collets are movable between an expanded position and a collapsed position.

As also described in further detail herein, a fluid connector that fluidly connects a first fluid system with a fluid port of a second fluid system can include a generally cylindrical construction that includes a body, a collet assembly with a plurality of collets, a sleeve, a piston, and a longitudinal axis. First and second handles are connected to the piston at opposite diametric locations so that the first and second handles oppose one another, and the first and second handles can be manually actuated to actuate the piston from a default position to a connection position.

As also described in further detail herein, a fluid connector that fluidly connects a first fluid system with a fluid port of a second fluid system can include a body, a collet assembly with a plurality of collets, a sleeve, a piston, and a longitudinal axis. The collet assembly surrounds the piston and the collets are movable between an expanded position and a collapsed position. The body surrounds the piston and the collet assembly. The sleeve surrounds the body, the collet assembly, and the piston, and the sleeve is biased in a first direction parallel to the longitudinal axis by a sleeve spring. The piston is slideably disposed within the body and the collet assembly for sliding movement relative thereto in a direction parallel to the longitudinal axis between a default position and connection position permitting connection with the fluid port of the second fluid system. The piston is biased by a piston spring in a second direction, opposite the first direction, parallel to the longitudinal axis so that the piston is biased by the piston spring toward the default position to a default connected position. In addition, the piston includes a collet actuation portion that controls movements of the plurality of collets between the expanded position and the collapsed position. The collet actuation portion is engaged with the plurality of collets to force the collets to the expanded position when the piston is at the default position, and the collet actuation portion permits movement of the plurality of collets to the collapsed position when the piston is at the connection position. A seal is disposed between the sleeve and the collet assembly and is positioned to seal with the second fluid system to prevent fluid leakage between the fluid connector and the second fluid system. In addition, the body, the collet assembly and the piston can tilt relative to the sleeve at an angle greater than 1 degree with the seal maintaining sealing engagement with the second fluid system to prevent fluid leakage between the fluid connector and the second fluid system.

DRAWINGS

FIG. 1 a perspective view of a fluid connector described herein.

FIGS. 5A and 5B show the fluid connector in the default or home position after connection to the fluid port of the second fluid system.

DETAILED DESCRIPTION

Figure 1:
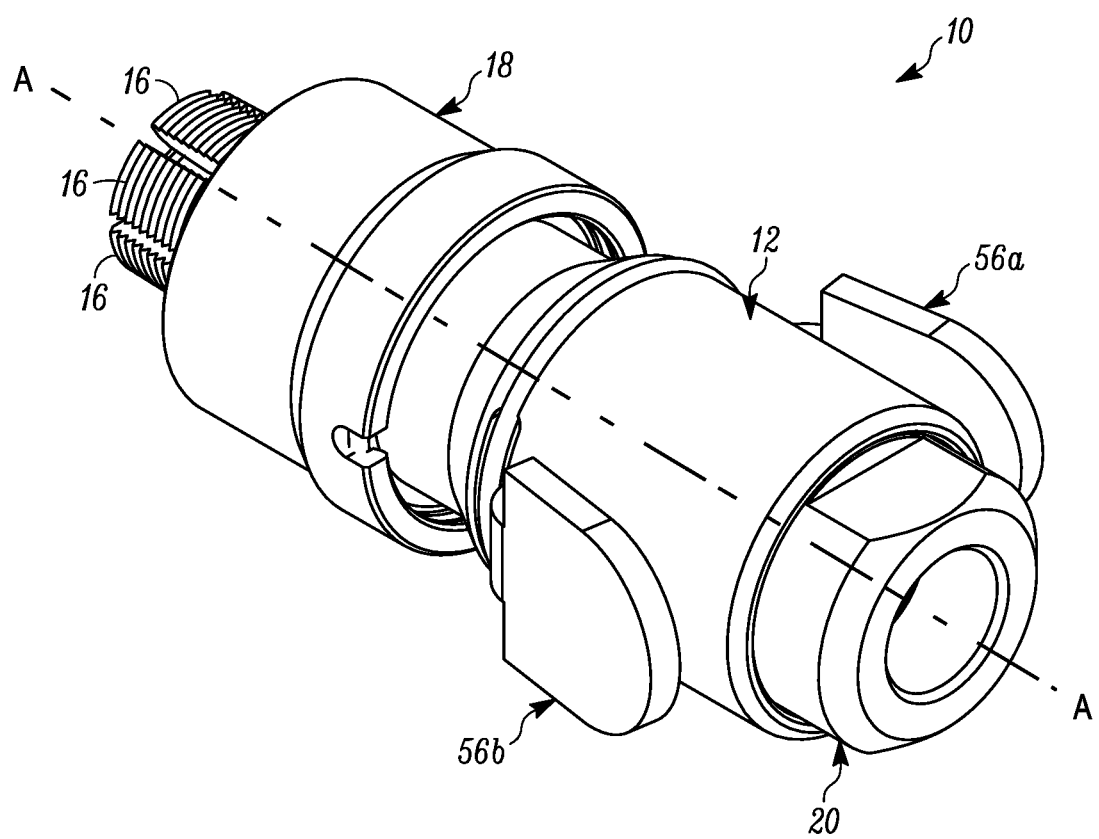
Figure 2:
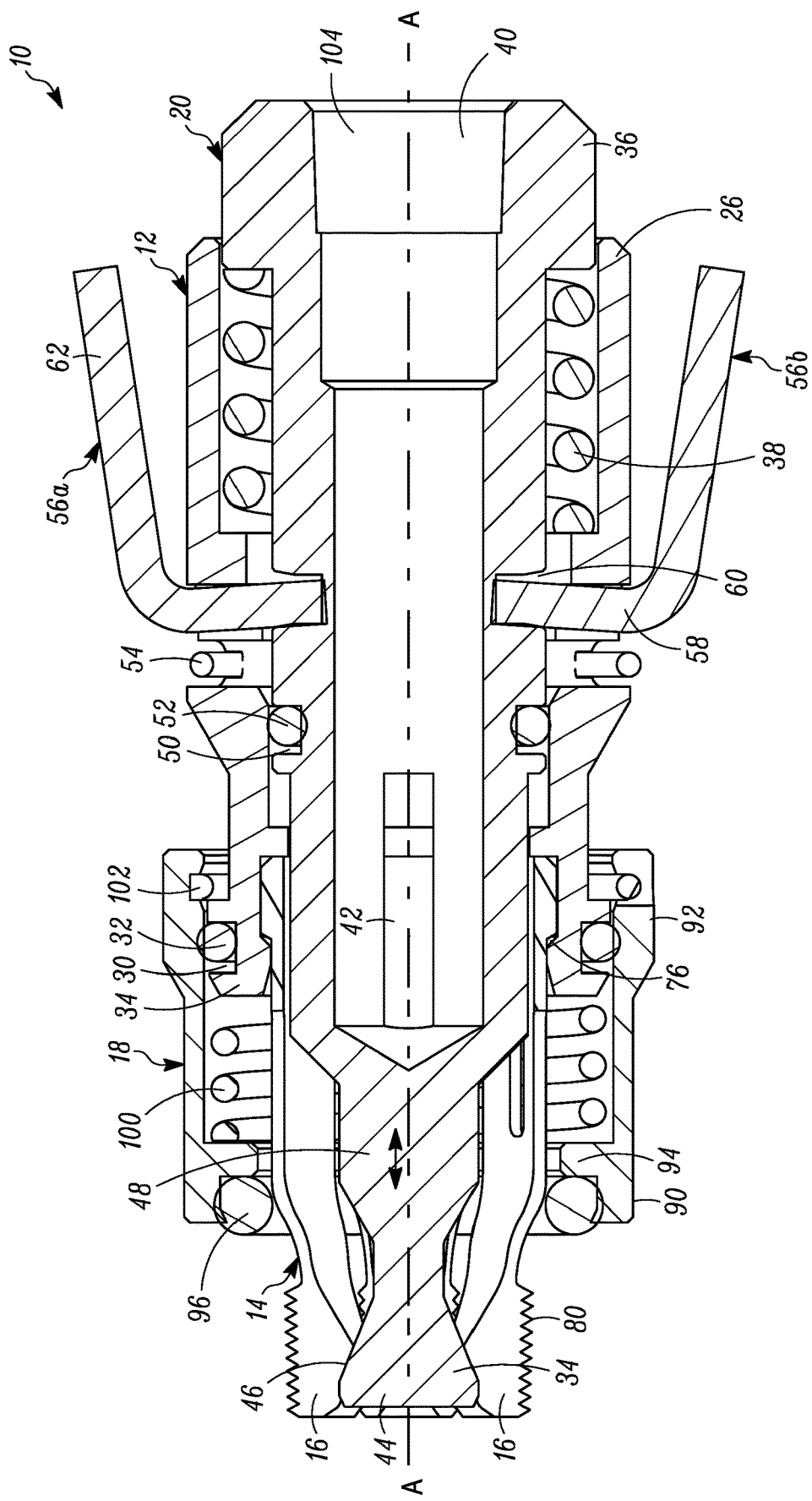
FIG. 2 is a longitudinal cross-sectional view of the fluid connector of FIG. 1 with the fluid connector in a default or home position.
Figure 3:
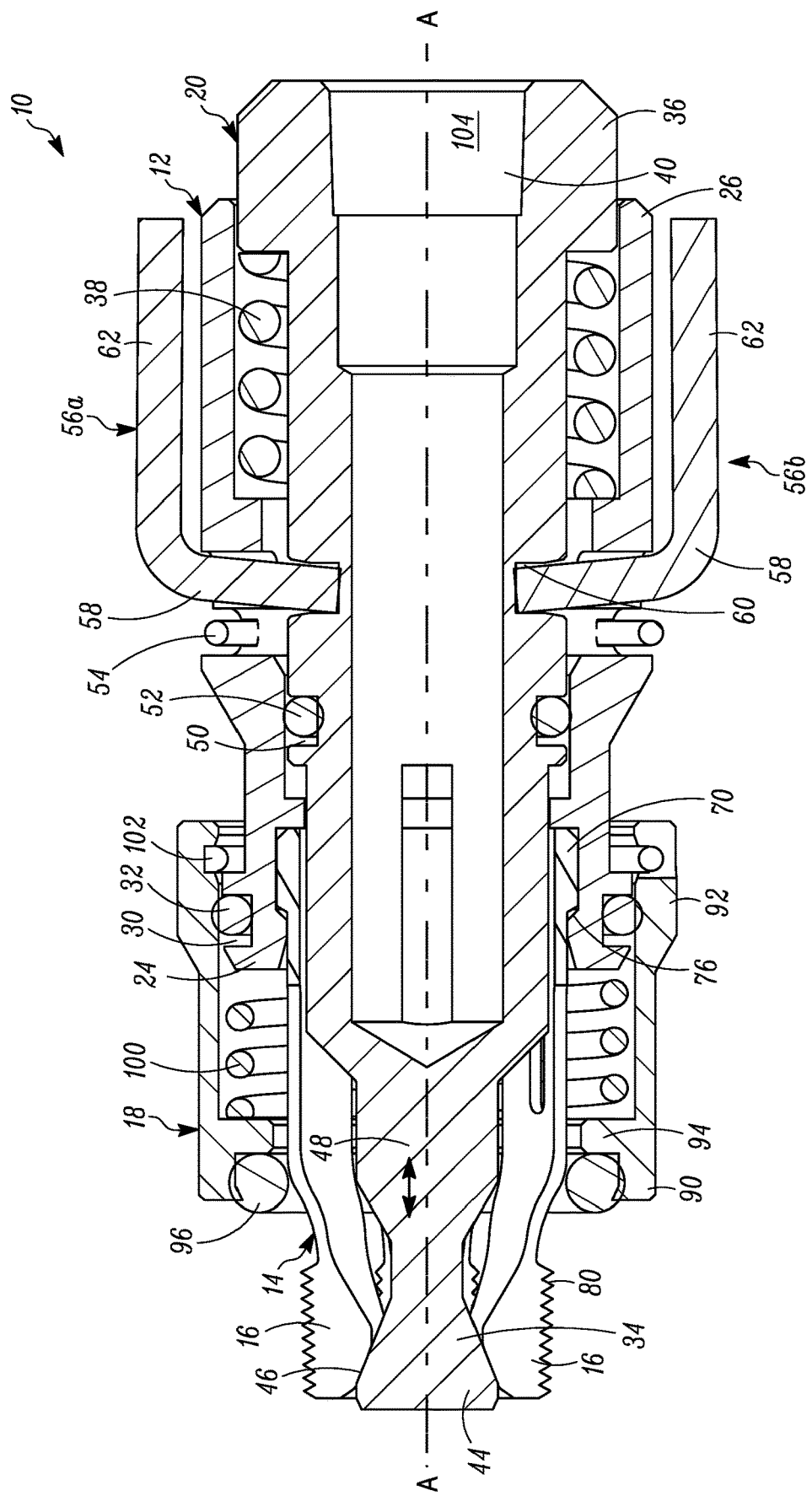
FIG. 3 is a longitudinal cross-sectional view of the fluid connector similar to FIG. 2 with the fluid connector in a connection position.
Figure 4A:
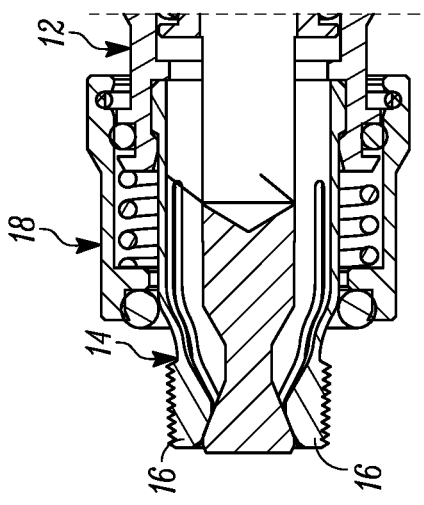
FIGS. 4A and 4B show the fluid connector in the connection position prior to connection to a fluid port of a second fluid system, with FIG. 4A being a partial cross-sectional view taken along line A-A of FIG. 4B.
Figure 4B:
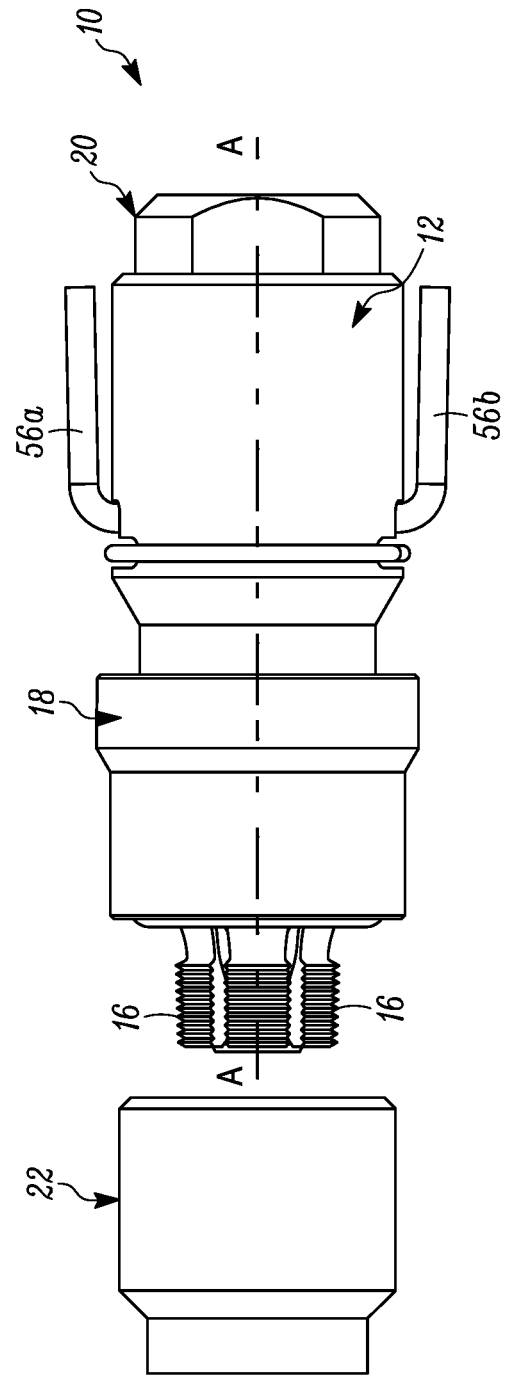

Referring initially to FIGS. 1-3, an embodiment of a fluid connector 10 is illustrated. In this example, the fluid connector 10 is a generally cylindrical construction that includes a body 12, a collet assembly 14 with a plurality of collets 16, a sleeve 18, a piston 20, and a longitudinal axis A-A. The fluid connector 10 can be used to, for example, fluidly connect a first fluid system (not shown) with a fluid port 22 (see FIGS. 4B, 5B, 6 and 7) of a second fluid system for transferring fluids, including gaseous or liquid fluids, between the first and second fluid systems, or the fluid connector 10 can connect to the fluid port 22 of the second fluid system for sealing the second fluid system using the fluid connector 10.

The fluid connector 10 can accommodate side loads applied to the fluid connector 10, while maintaining its seal with the second fluid system to prevent fluid leakage between the fluid connector 10 and the second fluid system.

Referring to FIGS. 1-3, the body 12 is a generally elongated, generally cylindrical structure that surrounds portions of the piston 20 and the collet assembly 14. The body 12 has a first or front end 24 and a second or rear end 26. At or near the first end 24, the body 12 includes a radially outward facing channel 30 in which a sleeve seal 32 is disposed. The sleeve seal 32 seals with an interior surface of the sleeve 18.

The piston 20 is a generally elongated, generally cylindrical structure with a first or front end 34 and a second or rear end 36. The piston 20 is slideably disposed within the body 12 and the collet assembly 14 for sliding movement relative thereto in a direction parallel to the longitudinal axis A-A between a default position (FIG. 2) and a connection position (FIG. 3) permitting connection with the fluid port 22 of the second fluid system. A piston spring 38 is engaged between the piston 20 and the body 12 to bias the piston 20 in a direction toward the right in FIGS. 2 and 3 parallel to the longitudinal axis A-A so that the piston 20 is biased to the default position. A central fluid flow channel 40 is formed at least partially through the piston 20 from the second end 36 toward the first end 34. In this embodiment, the fluid flow channel 40 stops short of the first end 34. Instead, one or more radial passageways 42 are formed through the piston 20 that place the flow channel 40 in fluid communication with an exterior of the piston 20 to permit fluid flow through the piston 20.

The first end 34 of the piston 20 includes a collet actuation portion 44 that controls movements of the plurality of collets 16 between an expanded position (FIG. 2) and a collapsed position (FIG. 3) as the piston 20 is actuated between the default position (FIG. 2) and the connection position (FIG. 3). The collet actuation portion 44 can have any configuration that is suitable for actuating the collets 16. In the illustrated example, the collet actuation portion 44 is a frusto-conical member disposed at the first end 34 of the piston 20. The frusto-conical member includes a tapered outer surface 46 that tapers or reduces in diameter from the first end 34 toward the second end 36. The tapered outer surface 46 of the collet actuation portion 44 is engaged with the plurality of collets 16 to force the collets 16 to the expanded position when the piston 20 is at the default position, and the tapered outer surface 46 permits movement of the plurality of collets 16 to the collapsed position when the piston 20 is at the connection position. The small diameter end of the frusto-conical member is connected to a solid portion 48 of the piston 20 that separates the flow channel 40 from the collet actuation portion 40.

Referring to FIGS. 2 and 3, the piston 20 includes a radially outward facing channel 50 in which a piston seal 52 is disposed. The piston seal 52 seals with an interior surface of the body 12 to prevent leakage of fluid between the piston 20 and the body 12. To the rear of the piston seal 52, a retaining ring 54 is arranged in a groove to hold handles 56a, 56b (described further below) in place such that the handles 56a, 56b retain the piston 20 relative to the body 12.

To actuate the piston 20 from the default position (FIG. 2) to the connection position (FIG. 3), first and second handles 56a, 56b are connected to the piston 20 at opposite diametric locations of the piston 20 so that the first and second handles 56a, 56b oppose one another. The first and second handles 56a, 56b can be manually actuated to actuate the piston 20 from the default position to the connection position against the biasing force of the piston spring 38, with the piston spring 38 returning the piston 20 back to the default position when the handles 56a, 56b are released. The handles 56a, 56b can have any construction suitable for actuating the piston 20. For example, in the illustrated example, each handle 56a, 56b comprises an L-shaped construction, with a leg portion 58 extending through the body 12 and into a slot 60 formed in the outer surface of the piston 20, and a stem portion 62 extending from the leg portion 58 at an angle to the longitudinal axis A-A. The end of each of the leg portions 58 is pivotally supported in the respective slot 60 to allow the handles 56a, 56b to be manually pivoted or actuated toward one another by manually pressing on the handles 56a, 56b. As shown in FIG. 3, the stem portions 62 of the handles 56a, 56b can be actuated to a position where they are substantially parallel to the longitudinal axis A-A, or the stem portions 62 can be actuated even further toward the body 12. As the handles 56a, 56b pivot, they force the piston to the connection position (or to the left in FIGS. 2 and 3). Upon releasing the handles 56a, 56b, the piston spring 38 returns the piston 20 back to the default position and returning the handles 56a, 56b to their angled position shown in FIG. 2.

The collet assembly 14 with the plurality of collets 16 mechanically connect the fluid connector 10 with the fluid port 22. The collet assembly 14 is a generally elongated, generally cylindrical structure that surrounds a portion of the piston 20, and that is surrounded by a portion of the body 12 and by the sleeve 18. The collet assembly 14 is secured to the body 12 so that the collet assembly 14 is fixed relative to the piston 20 and does not move with the piston 20 in the direction of the longitudinal axis A-A.

Figure 8:
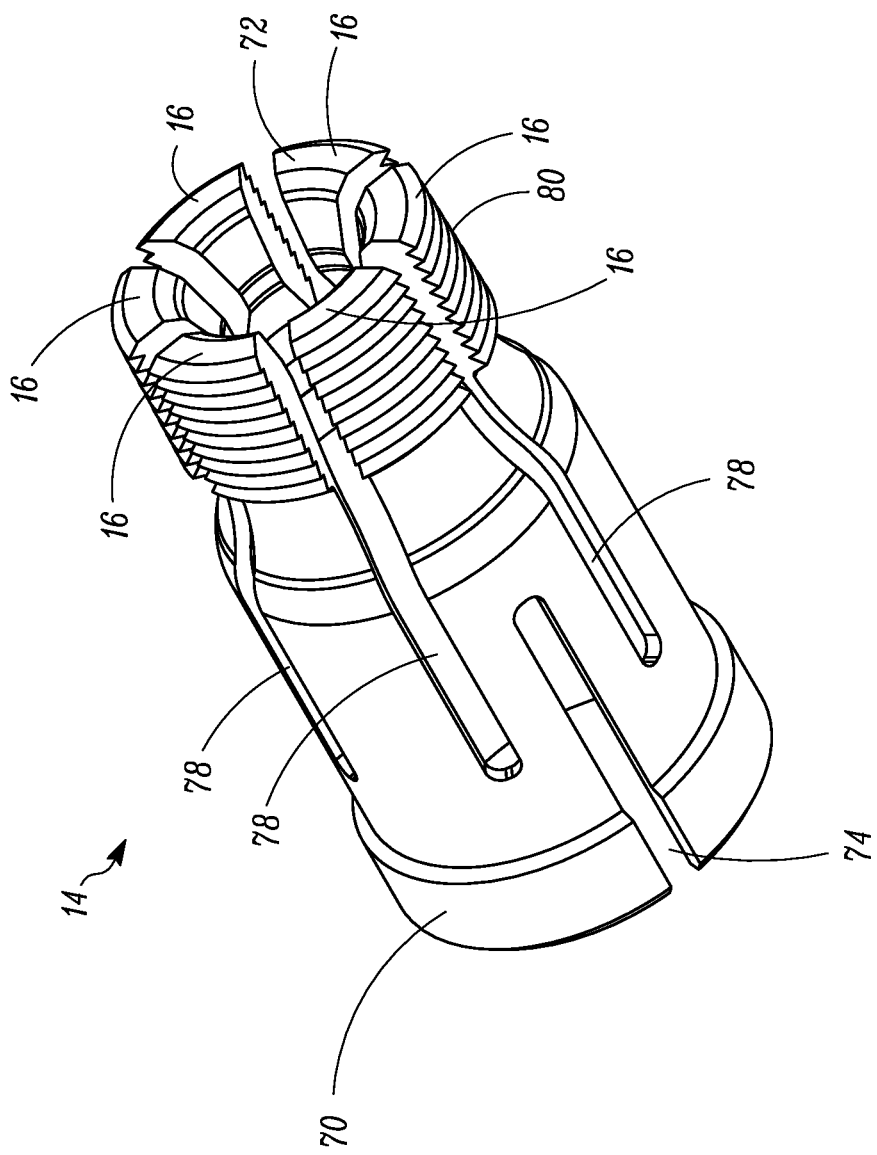
FIG. 8 is a perspective view of the single piece, unitary construction of the collet assembly that can be used on the fluid connector.

The collet assembly 14 can have any construction that is suitable for achieving the functions of the collet assembly 14. For example, referring to FIGS. 2-3 and 8, the collet assembly 14 can be a single piece, unitary construction with a ring-shaped first or rear end 70 and the collets 16 integrally formed with and extending forwardly from the rear end 70 to a second or front end 72. As best seen in FIG. 8, the rear end 70 includes a slot 74 that allows the rear end 70 of the collet assembly 14 to flex or collapse and snap into a groove 76 (seen in FIGS. 2 and 3) formed on the inner surface of the body 12. The thickness of the rear end 70 is slightly enlarged to allow the snap fit engagement with the groove 76 to lock the collet assembly 14 to the body 12.

Returning to FIG. 8, the collet assembly 14 is illustrated as having six integrally formed collets 16, however a larger or smaller number of collets 16 can be used. The collets 16 have slots 78 formed therebetween that allow fluid to flow between the collets 16 and to or from the radial passageways 42. The slots 78 also permit the collets 16 to flex radially from the collapsed position to the expanded position under the force from the collet actuation portion 44. The construction of the collet assembly 14 is such that the collets 16 are naturally biased to the collapsed position so that the collets 16 return automatically to the collapsed position when the collet actuation portion 44 is actuated to the connection position shown in FIG. 3. This permits the ends of the collets 16 to be inserted into the port 22 for connection.

Figure 9:
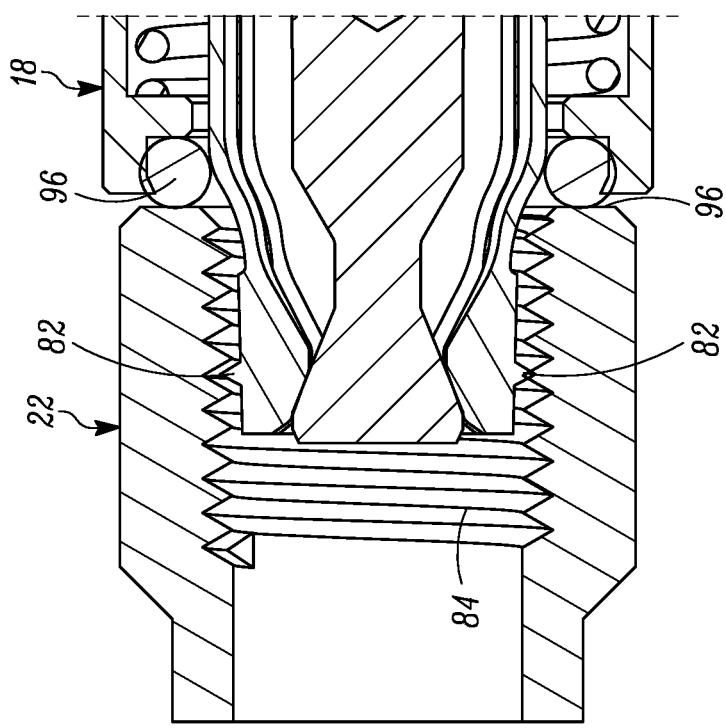
FIG. 9 is a longitudinal cross-sectional view of a portion of another embodiment of a fluid connector where the collets of the fluid connector use a single external thread.

The ends 72 of the collets 16 are configured for connection with the port 22. The ends 72 can have any construction suitable for achieving the connection described herein. For example, in the illustrated example in FIGS. 2-3 and 8, the end 72 of each collet 16 is provided with a plurality of external threads 80. In an alternative embodiment illustrated in FIG. 9, the end of each collet 16 is provided with a lesser number of threads, for example a single thread 82. The threads 80, 82 are configured to grip internal threads 84 of the port 22. The internal threads 84 can be seen in FIGS. 5A, 6-7 and 9.

Unlike the threads in the fluid connector described in U.S. Pat. No. 4,688,830, the threads 80, 82 are not designed to match the threads 84 on the threaded port 22. Instead, the threads 80, 82 are configured to grip on the crests of the internal threads 84 and between the threads 84 providing an effective grip with the threaded port 22. Since the threads 80, 82 do not actually mate with the threads 84, the connector 10 can be made to work with multiple threaded ports 22.

In one embodiment, the exterior threads 80 have a threads per inch that is greater than a threads per inch of the interior threads 84 of the threaded port 22. For example, the threads per inch of the threads 80 can be approximately 2 times the threads per inch of the threads 84. However, other ratios can be used.

Returning to FIGS. 2 and 3, the sleeve 18 is a generally elongated, generally cylindrical structure that surrounds portions of the body 12, a portion of the collet assembly 14, and a portion of the piston 20. The sleeve 18 has a first or front end 90 and a second or rear end 92. A radially inwardly extending flange 94 is formed on the interior of the sleeve 18 near the end 90. A main seal 96 is disposed within the sleeve 18 at the end 90. The main seal 96 is positioned to seal against an end face 98 of the port 22 (see, for example, FIG. 6) when the connector 10 is connected to the port 22 to prevent fluid leakage.

Returning to FIGS. 2-3, a sleeve spring 100 is disposed between the flange 94 and the end 24 of the body 12. The sleeve spring 100 biases the sleeve 18 in a first direction parallel to the longitudinal axis A-A toward the left in FIGS. 2-3. In addition, a retaining ring 102 is engaged with the sleeve 18 to retain the sleeve 18 on the body 12.

There is a single point of contact between the sleeve 18 and the body 12. This single point of contact is formed by the sleeve seal 32. Due to this single point of contact, the sleeve 18 and the rest of the connector 10 can tilt relative to one another. In particular, the rest of the connector 10 tilts relative to the sleeve 18. Tilting may be caused by side loading that is applied to the connector 10 from a hose that is attached to a termination port 104 of the connector 10. The sleeve 18 is designed to allow relative tilting over a range of motion with the main seal 96 maintaining sealing engagement with the end face 98 of the port 22 to prevent fluid leakage between the fluid connector 10 and the port 22.

Figure 7:
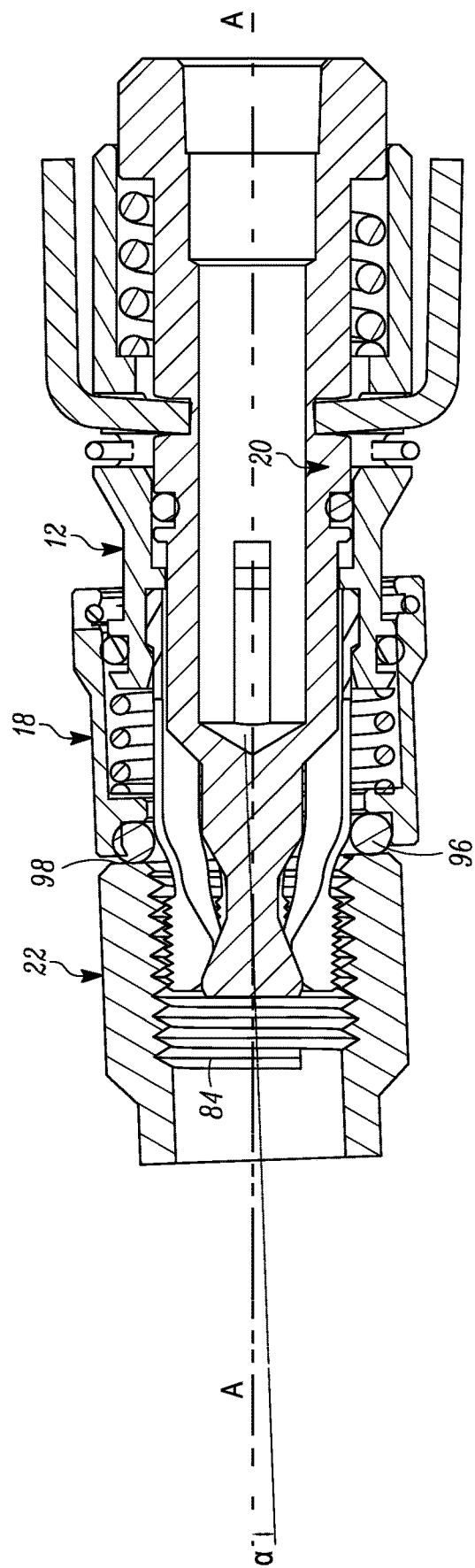
FIG. 7 is a longitudinal cross-sectional view of the fluid connector similar to FIG. 3 with a side load applied causing the sleeve of the connector to tilt.

Referring to FIG. 7, the sleeve 18 is designed to be able to tilt over an angle $\alpha$ relative to the longitudinal axis A-A while maintaining the seal. In one embodiment, the angle $\alpha$ is equal to or greater than 1 degree. In another embodiment, the angle $\alpha$ is between 1 degree and 10 degrees. In still another embodiment, the angle $\alpha$ is between 1 degree and 8 degrees. In still another embodiment, the angle $\alpha$ is between 1 degree and 5 degrees. In these disclosed ranges of the angle $\alpha$, the word "between" is intended to include numbers between the two end points, but also includes the end points as well. For example, the phrase between 1 and 10 degrees is intended to encompass all numbers between 1 and 10 degrees, but also 1 degree and 10 degrees.

The connector 10 operates as follows. The piston spring 38 pulls the piston 20 backwards relative to the body 12 and the collets 16 forcing the tapered surface 46 of the collet actuation portion 44 to wedge the collets 16 outward and grip the internal threads 84 of the port 22. See FIGS. 5A and 6. To begin the connection, the handles 56a, 56b are depressed (i.e. squeezed). This forces the piston 20 and the collet actuation portion 44 forward (or to the left in FIGS. 2 and 3), which allows the collets 16 to automatically retract to their default or collapsed position. This prepares the connector 10 for connection to the port 22.

To connect to the port 22, while the handles 56a, 56b are depressed, the connector 10 is pushed firmly against the port 22 with the ends of the collets 16 within the interior of the port 22. This will compress the sleeve spring 100 and the main seal 96 is pressed against the end face 98. When the handles 56a, 56b are released, the piston spring 38 pulls the piston 20 and the collet actuation portion 44 back, with the tapered surface 46 of the collet actuation portion 44 forcing the collets 16 open to the expanded position to engage the internal threads of the port 22. The piston spring 38 will provide enough force to make the initial grip of the threads 80, 84. As the actuation portion 44 pulls back, the collets 16 will wedge against the threads of the port 22 and limit the movement of the piston 20. This limitation of movement will take the force off the handles 56a, 56b.

Figure 6:
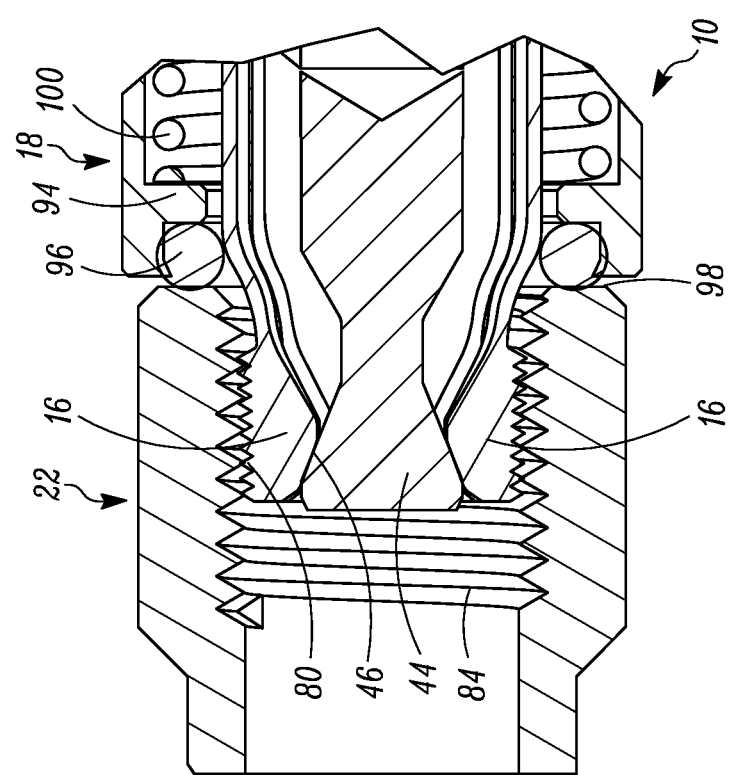
FIG. 6 is a close-up detailed view of the interface between the fluid connector and the fluid port of the second fluid system.

Referring to FIG. 6, by having the threads per inch of the threads 80 of the collets 16 greater than the threads per inch of the threads 84 of the port 22, the threads 80 will effectively grip not only on the crests of the threads 84 but also slightly between the threads 84. That way, an exacting matching of the threads is not required, which allows for one set of collets 16 to grip many sizes of threads so that the connector 10 can be used with ports 22 having different internal threads.

Once fluid pressure is introduced into the connector 10, the piston 20 will proportionally pull backwards further forcing the collets 16 open and enhancing the gripping capabilities. The sleeve 18 will also be pressurized to push against the face 98 of the port 22 further enhancing the main seal 96 capabilities.

Figure 10:
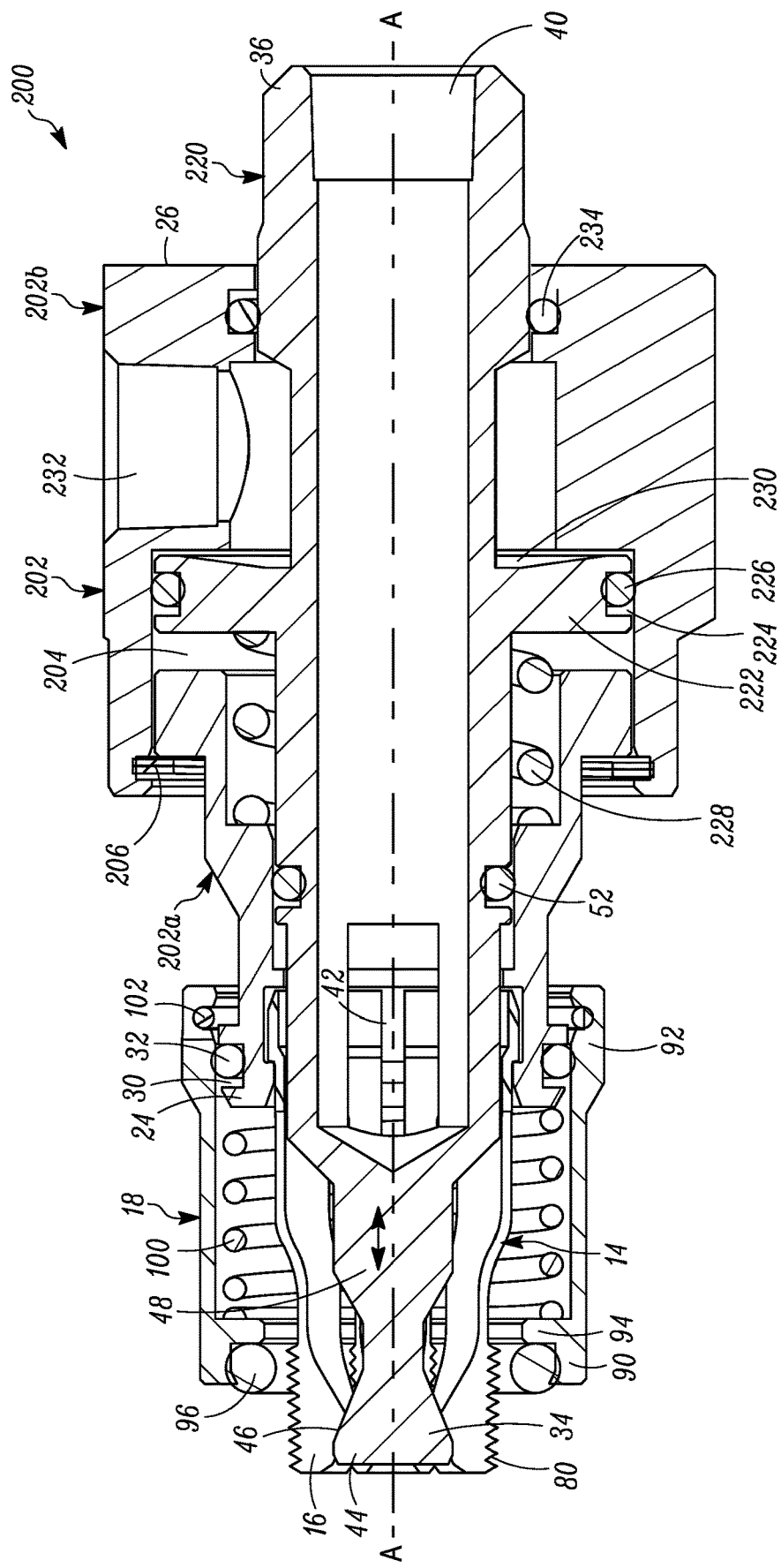
FIG. 10 is a longitudinal cross-sectional view of another embodiment of a fluid connector that is actuated by a fluid such as air.

FIG. 10 is a longitudinal cross-sectional view of another embodiment of a fluid connector 200. In this embodiment, elements in the fluid connector 200 that are similar or identical in construction to elements in the fluid connector 10 are referenced using the same reference numerals. In the fluid connector 200, instead of having the handles 56a, 56b to actuate the piston 20, the fluid connector 200 includes a piston 220 that is actuated by a fluid. The piston 220 can be actuated using any suitable fluid. For example, the piston 220 can be actuated by air in which case the piston 220 can be referred to as being pneumatically actuated. Alternatively, the piston 220 can be actuated by hydraulic fluid in which case the piston 220 can be referred to as being hydraulically actuated.

The fluid connector 200 is a generally cylindrical construction that includes a body 202, the collet assembly 14 with the plurality of collets 16, the sleeve 18, the piston 220, and the longitudinal axis A-A. The fluid connector 200 can be used to, for example, fluidly connect a first fluid system (not shown) with the fluid port 22 (see FIGS. 4B, 5B, 6 and 7) of a second fluid system for transferring fluids, including gaseous or liquid fluids, between the first and second fluid systems, or the fluid connector 200 can connect to the fluid port 22 of the second fluid system for sealing the second fluid system using the fluid connector 200.

As with the fluid connector 10, the fluid connector 200 can accommodate side loads applied to the fluid connector 200, while maintaining its seal with the second fluid system to prevent fluid leakage between the fluid connector 200 and the second fluid system.

The body 202 is a generally elongated, generally cylindrical structure that surrounds portions of the piston 220 and the collet assembly 14. In this embodiment, the body 202 is a two-piece construction with a front body portion 202a and a rear body portion 202b. The front body portion 202a defines the first or front end 24 with the radially outward facing channel 30 in which the sleeve seal 32 is disposed, while the rear body portion 202b defines the second or rear end 26.

A front end of the rear body portion 202b defines a cylindrical chamber 204, with a rear end of the front body portion 202a being slidably received within the chamber 204. A retaining ring 206 retains the rear end of the front body portion 202a within the chamber 204.

The piston 220 is somewhat similar in construction to the piston 20, in particular the front end 34. However, the piston 220 includes a radially outward extending, circumferential flange 222 that forms an actuating piston. The flange 222 is slidably disposed within the chamber 204 between the rear end of the front body portion 202a and the end wall of the chamber 204. The radial outer perimeter edge of the flange 222 has a circumferential channel 224 in which is received a seal 226 that provides a fluid tight seal between the flange 222 and an interior surface of the portion of the rear body portion 202b defining the chamber 204. A piston spring 228, similar in function to the piston spring 38, is engaged between the flange 222 and the front body portion 202a to bias the flange 222 and the piston 220 in a direction toward the right in FIG. 10 parallel to the longitudinal axis A-A so that the piston 220 is biased to the default position. A fluid chamber 230 is defined between the right side of the flange 222 and the end wall of the chamber 204 to receive an actuating fluid, such as air, to actuate the piston 220 to the left in FIG. 10 against the biasing force of the piston spring 228. In addition, a seal 234 seals between an inner surface of the rear body portion 202b and an outer surface of the piston 220.

In use, actuating fluid is directed into the fluid chamber 230 through an inlet port 232 that is formed in the rear body portion 202b. By directing a pressurized actuating fluid into or from the fluid chamber 230, movement of the piston 220 can be controlled for connection and disconnection. The function and operation of the fluid connector 200 is otherwise identical to the function and operation of the fluid connector 10.

By the way the connectors 10, 200 grip against the threads 84, and not into the threads as is the case in the fluid connector described in U.S. Pat. No. 4,688,830, the connectors 10, 200 could tip and lose seal with the port 22. The tipping can be caused, for example, by the side load that is applied to the connectors 10, 200 from a hose attached to the termination port 104 of the connectors 10, 200. To accommodate this potential tipping condition, the bodies 12, 202 are designed to tip relative to the sleeve 18 which stays flush to the port 22 and seals against the end face 98.

The tilting of the sleeve 18, the mismatch between the threads 80, 84, the single piece, unitary construction of the collet assembly 14, the opposing first and second handles 56a, 56b for actuating the piston 20, or the fluid actuation of the piston 220 in the fluid connector 200, can be used in combination with one another as illustrated and described herein, individually and separately by themselves in fluid connectors, or in any combination thereof.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A fluid connector that fluidly connects a first fluid system with a fluid port of a second fluid system, comprising:
a generally cylindrical construction that includes a body, a collet assembly with a plurality of collets, a sleeve, a piston, and a longitudinal axis;
the collet assembly surrounds the piston, and the plurality of collets are movable between an expanded position and a collapsed position;
the body surrounds the piston and the collet assembly, the body includes a first end and a second end;
the sleeve surrounds the body, the collet assembly, and the piston, and the sleeve is biased in a first direction parallel to the longitudinal axis by a sleeve spring, the sleeve includes a first end and a second end, and the second end of the body extends past the second end of the sleeve;
the piston is slideably disposed within the body and the collet assembly for sliding movement relative thereto in a direction parallel to the longitudinal axis between a default position and connection position permitting connection with the fluid port of the second fluid system; the piston is biased by a piston spring in a second direction, opposite the first direction, parallel to the longitudinal axis so that the piston is biased by the piston spring to the default position;
the piston includes a collet actuation portion that controls movements of the plurality of collets between the expanded position and the collapsed position, the collet actuation portion is engaged with the plurality of collets to force the collets to the expanded position when the piston is at the default position, and the collet actuation portion permits movement of the plurality of collets to the collapsed position when the piston is at the connection position;
a seal disposed between the sleeve and the collet assembly and positioned to seal with the second fluid system to prevent fluid leakage between the fluid connector and the second fluid system; and
the body, the collet assembly and the piston are tiltable relative to the sleeve at an angle greater than 1 degree with the seal maintaining sealing engagement with the second fluid system to prevent fluid leakage between the fluid connector and the second fluid system.

2. The fluid connector of claim 1, wherein the angle is between 1 degree and 10 degrees.

3. The fluid connector of claim 1, wherein the angle is between 1 degree and 8 degrees.

4. The fluid connector of claim 1, wherein the angle is between 1 degree and 5 degrees.

5. The fluid connector of claim 1, wherein each collet of the plurality of collets includes exterior threads, the fluid port includes interior threads, and the exterior threads do not match the interior threads.

6. The fluid connector of claim 5, wherein the exterior threads have a threads per inch that is greater than a threads per inch of the interior threads.

7. The fluid connector of claim 1, wherein the collet assembly is a single piece, unitary construction.

8. The fluid connector of claim 1, further comprising first and second handles connected to the piston at opposite diametric locations so that the first and second handles oppose one another, and the first and second handles can be manually actuated to actuate the piston.

9. The fluid connector of claim 1, wherein the piston includes an actuating piston and a fluid chamber is defined between the actuating piston and the body that receives an actuating fluid that acts on the actuating piston to actuate the piston.

10. A fluid connector that fluidly connects a first fluid system with a fluid port of a second fluid system, comprising:
a generally cylindrical construction that includes a body, a collet assembly with a plurality of collets, a sleeve, a piston, and a longitudinal axis;
a seal disposed between the sleeve and the collet assembly and positioned to seal with the second fluid system to prevent fluid leakage between the fluid connector and the second fluid system; and
the body, the collet assembly and the piston are tiltable relative to the sleeve at an angle greater than 1 degree with the seal maintaining sealing engagement with the second fluid system to prevent fluid leakage between the fluid connector and the second fluid system.

11. The fluid connector of claim 10, wherein the angle is between 1 degree and 10 degrees.

12. The fluid connector of claim 10, wherein the angle is between 1 degree and 8 degrees.

13. The fluid connector of claim 10, wherein the angle is between 1 degree and 5 degrees.

14. The fluid connector of claim 10, wherein the collet assembly is a single piece, unitary construction.

* * * * *